US005119776A

United States Patent [19]

Bakker

[11] Patent Number: 5,119,776

[45] Date of Patent: Jun. 9, 1992

[54] COMPACT BEARING CAP FOR OVERHEAD CAMSHAFT

[75] Inventor: Emile A. M. Bakker, Monschau/Hoefen, Fed. Rep. of Germany

[73] Assignee: Chrysler Corporation, Highland Park, Mich.

[21] Appl. No.: 767,589

[22] Filed: Sep. 30, 1991

[51] Int. Cl.[5] .......................... F01L 1/04; F02F 1/00; F16C 35/02

[52] U.S. Cl. .............................. 123/193.5; 123/90.27; 384/432; 384/434

[58] Field of Search ............. 123/193 H, 90.22, 90.27; 384/432, 434, 195 H

[56] References Cited

U.S. PATENT DOCUMENTS

| | | | |
|---|---|---|---|
| 4,199,202 | 4/1980 | Maeda | 384/434 |
| 4,534,325 | 8/1985 | Tanaka | 123/195 H |
| 4,593,657 | 6/1986 | Aoi et al. | 123/90.27 |
| 4,612,885 | 9/1986 | Yoshikawa | 123/90.27 |
| 4,739,735 | 4/1988 | Ichida et al. | 123/90.27 |
| 4,821,693 | 4/1989 | Koller | 123/193 H |
| 4,823,747 | 4/1989 | Wagner et al. | 123/193 H |
| 4,854,746 | 8/1989 | Baugh et al. | 384/432 |
| 4,972,813 | 11/1990 | Sugiura | 123/193 H |
| 5,024,187 | 6/1991 | Bakker | 123/193 H |

*Primary Examiner*—Andrew M. Dolinar
*Assistant Examiner*—M. Macy
*Attorney, Agent, or Firm*—Kenneth H. MacLean

[57] ABSTRACT

An improved bearing cap arrangement for attaching a camshaft, the bearing cap characterized by a semi-cylin- or the like may be placed immediately adjacent the camshaft, the bearing cap characterized by a simi-cylindrical portion extending over the camshaft and a single laterally projecting portion on one side of the camshaft adapted to receive fasteners securing the bearing cap to the cylinder head whereby the cylinder head bolt is located adjacent the second side of the camshaft.

8 Claims, 2 Drawing Sheets

COMPACT BEARING CAP FOR OVERHEAD CAMSHAFT

RELATED APPLICATION

This application is related to a previous application Ser. No. 07/566,921, filed Aug. 14, 1990, by the same inventor but claiming another invention.

BACKGROUND OF THE INVENTION

1. Field of the Invention

This application concerns an overhead camshaft type internal combustion engine. Specifically, this concerns an engine cylinder head with single or dual overhead camshafts supported therein for rotation in synchronization with the engines crankshaft. The camshaft is typically mounted in split bearings including bearing caps attached to the cylinder head assembly by cap screws or the like, one screw located on each side of the camshaft. The subject bearing cap is mounted to the cylinder head by fasteners located to only one side of the camshaft so that space adjacent the other side is available for other purposes.

2. Description of Related Art

The U.S. Pat. Nos. 4,495,903 to Asano and 4,593,657 to Aoi et al., both discloses a cylinder head assembly with a camshaft secured thereto by a complex and elongated bearing cap. The bearing cap is relatively large and heavy and is secured to the cylinder head by fasteners located laterally to both sides of the camshaft with an end portion overlying a free end of the camshaft.

The Koller U.S. Pat. No. 4,821,693 discloses an overhead cam type cylinder head with an elongated holder device which loosely secures the camshaft in the cylinder head bearing prior to final assembly of the camshaft.

SUMMARY OF THE INVENTION

This application discloses an improved bearing cap particularly adapted to secure an end portion of a camshaft within a semi-cylindrical bearing journal of the cylinder head. The bearing cap is attached to the cylinder head at only one side portion leaving the second side flush with the outer dimension of the camshaft journal. By locating the fasteners attaching the bearing cap to one side of the camshaft, space adjacent the opposite side of the camshaft is available to permit positioning a stud or bolt for attaching the cylinder head to the engine immediately adjacent the camshaft.

Therefore, an object or advantage of this open bearing cap design is to provide efficient journaling for an overhead camshaft, characterized by a bearing cap open on one side of the camshaft and with fasteners for the bearing cap positioned laterally on the other side of the bearing cap. This allows the camshaft to be positioned closely adjacent a fastener attaching the cylinder head to the engine's cylinder block.

Another advantage of the subject open sided bearing cap construction, particularly when positioned at the end portion of the camshaft, is the compact arrangement permitting both fasteners attaching the bearing cap to the cylinder head and a fastener attaching the cylinder head to the engine block while maintaining a rigid camshaft end support to inhibits undesirable vibrations and flex.

A still further advantage of the subject single open bearing cap construction is weight saved by the simple bearing cap with two fasteners on one side of the camshaft as opposed to an alternative elongated and heavy bearing cap construction with fasteners on both sides of the camshaft.

Still further objects and advantages of the subject open bearing cap design will be more apparent by reference to the following detailed description of an embodiment, reference being made to the drawings thereof, described hereafter.

IN THE DRAWING

FIG. 1 is a planar view of a dual overhead cam type cylinder head assembly with the open sided end bearing cap for the end portions of a camshaft; and FIG. 2 is an elevational and sectioned view of the cylinder head assembly taken along section line 2—2 in FIG. 1 and looking in the direction of the arrows; and FIG. 3 is a elevational and sectioned view of the cylinder head assembly taken along section line 3—3 in FIG. 1 and looking in the direction of the arrows; and FIG. 3A is an enlarged view of the circled portion labeled 3A in FIG. 3; and FIG. 4 is an elevational and sectioned view of a central bearing of the cylinder head assembly taken along section line 4—4 in FIG. 1 and looking in the direction of the arrows; and FIG. 5 is an elevational and sectioned view of an open sided end bearing cap of the cylinder head assembly taken along section line 5—5 in FIG. 1 and looking in the direction of the arrows.

DETAILED DESCRIPTION OF A PREFERRED EMBODIMENT

Figure 1:
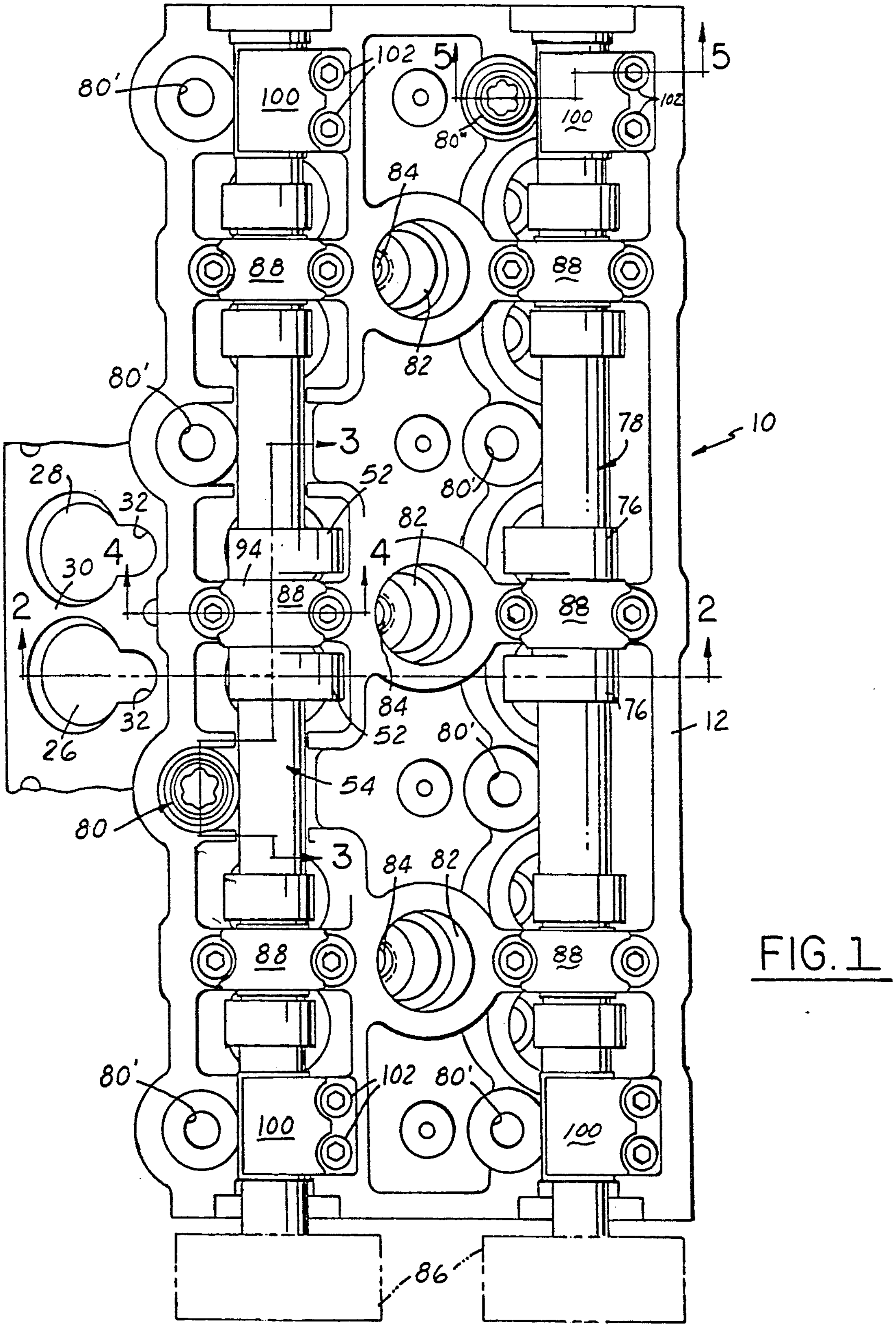
Figure 2:
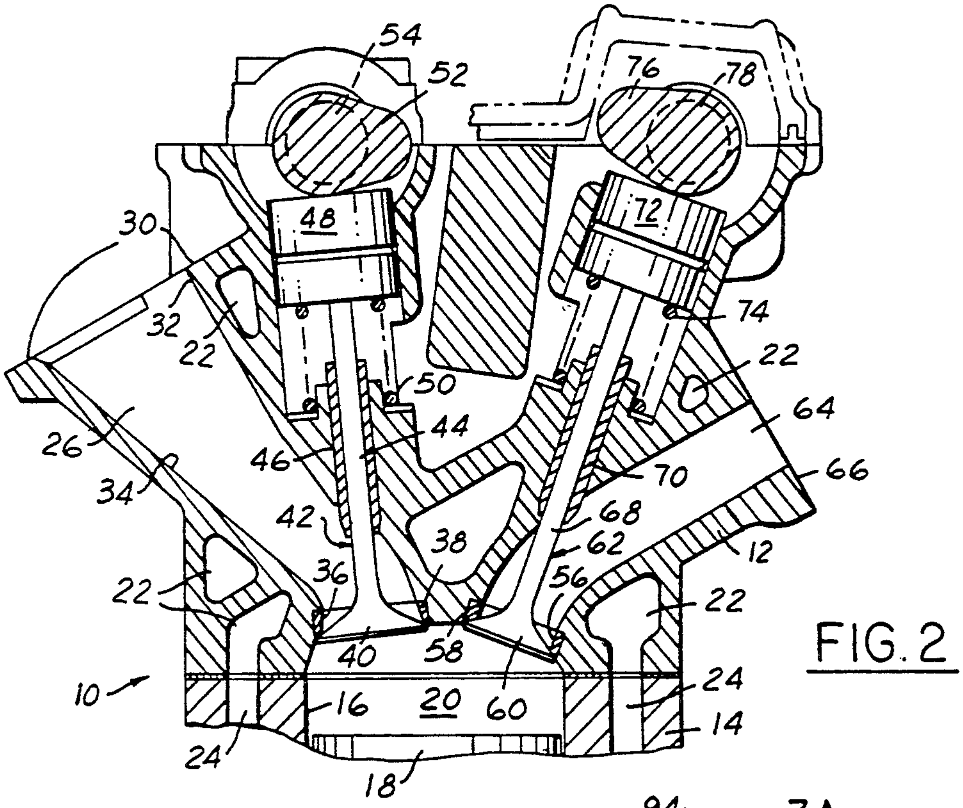

In FIGS. 1 and 2, an internal combustion engine 10 is partially illustrated. Engine 10 includes a dual overhead camshaft type cylinder head assembly 12. In FIG. 2, part of an engine block 14 is shown with a cylinder bore 16 and a piston 18 therein. By examination of FIG. 1, it can be deduced that the cylinder head 12 may be intended for either a three cylinder inline engine or is one bank of a six cylinder V-type engine. In either engine, a variable volume combustion chamber 20 is defined by the cylinder head 12, an associated cylinder bore 16 and a piston 18. Fuel is combined with the air in the combustion chamber 20. To maintain the internal engine temperatures at an acceptable level, coolant passages 22, 24 are formed in the cylinder head 12 and block 14, respectively.

In addition to enclosing the combustion chambers 20, the purpose of the cylinder head assembly is to direct a flow of air and fuel to the combustion chambers 20 and for directing exhaust gases therefrom. The cylinder head 12 has a pair of side by side inlet passages 26, 28 which supply air to each combustion chamber 20 (FIG. 1 shows only a pair of the passages for one cylinder). The air is directed to the cylinder head by an intake manifold (not shown). An exterior surface 30 of the cylinder head 12 surrounding passages 26, 28 is adapted to mate with the intake manifold. Each passage 26, 28 has an enlarged inlet opening portion 32. The inlet portions 32 are for the purpose of receiving a stream or spray of fuel from a fuel injector (not shown) which is mounted in the intake manifold.

Referring specifically to FIG. 2, fuel and air flow from the intake manifold past enlarging surface 30 and through the passage 26 to the combustion chamber 20. The wall 34 forming the intake passage 26 is made as smooth and as straight as possible so as not to offer undesirable resistance to fluid flow. The passage 26 opens to the combustion chamber 20 through an inlet port 36 partially formed by an annular intake valve seat member 38 attached to the cylinder head 12. Flow through port 36 is controlled by movements of an enlarged head portion 40 of a poppet type intake valve 42 shown in a closed operative position. Intake valve 42 has an elongated stem portion 44 which is supported by the cylinder block 12 within a tubular valve guide member 46 permitting the valve to reciprocate axially therein.

A hydraulic type valve lash adjuster assembly 48 contacts the upper end of the valve stem 44. A compression type coil spring 50 extends between the cylinder head 12 and the adjuster assembly 48 to normally maintain the intake valve upward in the illustrated closed position. As is known in the engine art, the valve 42 is moved downward against the force of the spring 50 to a more opened position by the action of a cam lobe 52 engaging the upper surface of the lash adjuster 48. The lobe 52 is moved by rotation of an associated intake camshaft 54. More will be said of the intake camshaft 54 hereinafter.

Referring to FIG. 2, exhaust gasses are discharged from the chamber 20 through an exhaust port 56 formed by an annular exhaust valve seat member 58. A movable, enlarged head portion 60 of an exhaust valve member 62 controls the opening and closing of exhaust port 56. The exhaust then flows through an exhaust passage 64 in the cylinder head 12. The exterior surface 66 of the cylinder head 12 is adapted to mate with an exhaust manifold (not shown) as is well known in the engine art.

The exhaust valve 62 is similar to the intake valve 42 and includes a stem portion 68 reciprocally supported in a valve guide member 70. The upper end portion of the valve 62 engages a lash adjuster 72 and the exhaust valve 62 is yieldably held upward in the illustrated closed operative position by a compression type coil spring 74. The valve 62 is moved downward into a more opened position by the action of an exhaust cam lobe 76 on the upper surface of the adjuster assembly 72 as an exhaust camshaft 78 is rotated.

Referring specifically to FIG. 1, a top view of the cylinder head 12 reveals the elongated intake camshaft 54. Lobe 52 shown in FIG. 2 is located over the middle cylinder bore. Also shown is the elongated exhaust camshaft 78 with lobe 76 shown in FIG. 2. The cylinder head 12 itself is secured to the engine block 14 by a plurality of bolt fasteners 80, only two of which are shown in FIG. 1. The bores through which the remaining fasteners extend are indicated by the numeral 80'. Perhaps FIG. 5 best shows relation of fastener 80 to the camshaft.

Referring to FIG. 1, cylinder head assembly 12 also provides cylindrical recesses 82 into which spark plugs (not shown) are adapted to extend. Each recess 82 has a lower threaded opening 84 into which the spark plug is mounted The camshafts 54 and 78 are mounted to the cylinder head 12 for rotation in synchronization with the rotation of the engine crankshaft a is well known in the engine art. For this purpose, the camshafts 54, 78 have enlarged input drives 86 attached to end portions as seen in FIG. 1. The input drives may take the form of toothed wheels or sprockets. A toothed elastomeric belt connects the sprockets with a similarly toothed sprocket on the end of the crankshaft. Alternately, the input drives may take the form of gears adapted to engage other gears associated with the crankshaft. Also, the drives 86 may take the form of toothed wheels adapted to engage a roller chain associated with the crankshaft.

Camshafts 54 and 78 are mounted to the cylinder head assembly 12 for rotation. The midportions of the camshafts are secured in several conventional bearings or journals, generally indicated by numeral 88 in FIG. 1. These bearings 88 are located in line with each combustion chamber as indicated by alignment with a spark plug recesses 82.

Figure 4:
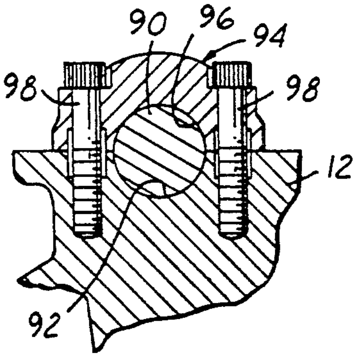

Details of a typical bearing 88 is shown in FIG. 4 and includes a journal portion 90 of the camshaft which overlies a semi-cylindrical surface 92 formed in the cylinder head 12. A bearing cap 94 is attached to the cylinder head 12 and has a semi-cylindrical surface 96 which together with surface 92 encircle the journal portion 90. Bearing cap 94 is secured to the cylinder head 12 by a pair of cap screws 98.

Figure 5:
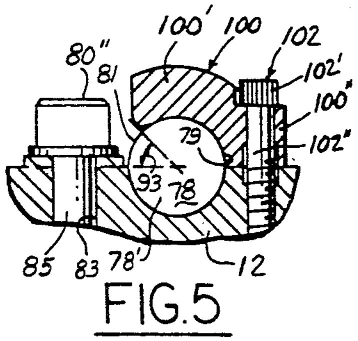

As shown in FIGS. 1, the end portions of the camshafts 54, 78 are secured to the cylinder head 12 by single open sided bearing caps 100. One side of the bearing cap is open (left side in FIG. 5). The bearing cap is attached to the cylinder head assembly 12 by a pair of cap screws 102 each positioned at a side of the bearing cap opposite to the open side (to the right in FIG. 5). As can be seen in FIG. 5, the screws 102 are located on the same side of the camshaft so that the configuration of the open sided cap 100 does not interfere with the bolt fastener 80'' which secures the end portion of the cylinder head assembly 12 to the engine block. By reference to FIG. 5, it is easy to see that the camshaft 78 and end cap 100 are much more closely positioned to the bolt 80'' than would be possible if fasteners 102 were located on both sides of the camshaft.

Referring specifically to FIG. 5, it can be seen that the bearing cap 100 includes a semi-cylindrical portion 100' overlying a journal portion 78' of the camshaft 78. The cap 100 also includes a side portion 100'' extending laterally from one side 79 of camshaft 78. The portion 100'' mates against the cylinder head 12 and is attached thereto by the fasteners 102. The fasteners 102 are in the form of cap screws with a head portion 102' and an elongated and partially threaded portion 102''.

It can be seen that the semi-cylindrical portion 100' extends in an arc over the camshaft journal 78'. In FIG. 5, the angular portion labeled by numeral 93 is uncovered while the portion 100' encircles the journal about 135 degrees. Thus, the wrap of the cylinder head bearing (180 degrees) plus the wrap of the bearing cap 100 (135 degrees) means that 315 degrees of the journal are encircled. This partial encirclement is sufficient to support the camshaft journal and inhibit vibrations. It also permits the cylinder head bolt 80'' to be placed in a bore 80' spaced immediately adjacent the second side 81 of the camshaft In FIG. 5, the closest surface 83 of the bolt's elongated shank 85 is a distance from the center of the camshaft less than the camshaft journal's diameter. In fact, the spacing from the surface 83 to the second side 81 of the camshaft is less than half of the camshaft's diameter. As explained in the previous paragraph, the camshafts 54 and 78 are supported for rotation during operation of the engine. In addition to this rotation, there is a tendency for the camshafts to move in the axial direction unless restrained. Axial movements are undesirable. A quite simple yet effective and reliable means for preventing axial movements of the camshaft is disclosed hereinafter.

Figure 3:
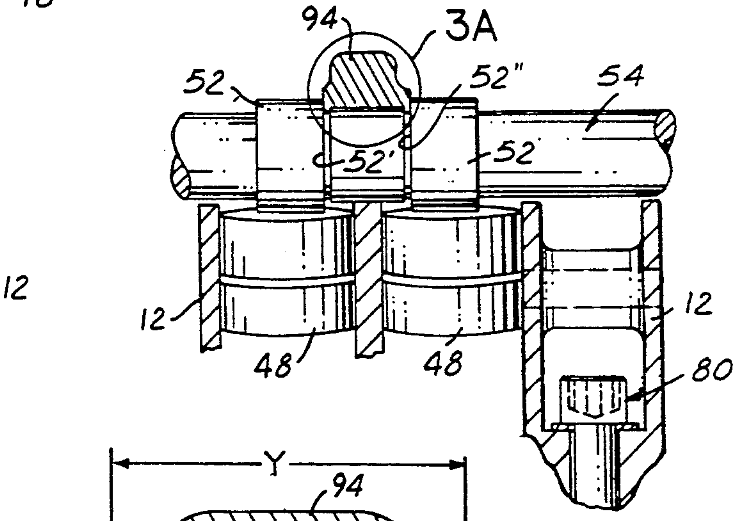
Figure 3A:
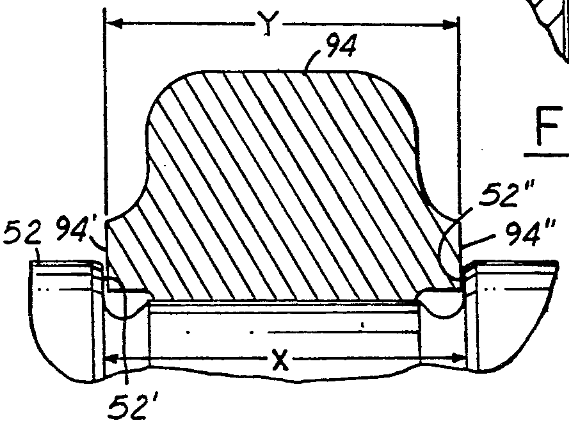

Reference is to the intake camshaft 54 and lobes 52 shown in FIGS. 1, 3 and 3A to describe the axial retention structure of the subject application. However, the subject axial retention feature is just as applicable to the exhaust camshaft as the intake camshaft. In FIG. 1, the middle lobes 52 for the central combustion chamber are discussed although other pairs of lobes could perform the axial retention function. As shown in FIGS. 3 and 3A, the two lobes 52 have adjacent, facing end thrust surfaces 52′ and 52″. The end surfaces 52′ and 52″ are prepared (machined) so that the end surfaces are absolutely square to the axis of the camshaft and smooth. Also, the axial spacing or distance X between the surfaces 52′ and 52″ is precisely matched to a designated spacing.

A pair of side surfaces 94′ and 94″ of the bearing cap 94 are prepared (machined) so that these surfaces are absolutely normal to the axis of the cylindrical bearing for the camshaft as shown in FIG. 4. The dimension Y between these side surfaces 94′ and 94″ is matched to a precise design dimension. When bearing cap 94 is secured to the cylinder head assembly 12 between end surfaces 52′ and 52″, the resultant close fit serves to locate and axially fix the camshaft relative to the cylinder head assembly. This close fit is shown in FIG. 3A but the tolerance between the lobes and the cap is exaggerated. The design dimension Y between surfaces 94′ and 94″ is slightly less than the design dimension X between surfaces 52′ and 52″. This is to accommodate thermal expansion differences between the parts. In a proposed engine cylinder assembly according to this design, the dimension X between surfaces 52′ and 52″ is 19.98-20.02 millimeters. The dimension Y between surfaces 94′ and 94″ is 19.92-19.96 millimeters. This provides a minimum total clearance of between 0.02 and a maximum of 0.10 millimeters.

Although only a single embodiment of the invention has been illustrated and described in detail, modifications are contemplated which would still be defined by the following claims which define the invention.

What is claimed is as follows:

1. In an internal combustion engine of the type having a cylinder head assembly with at least one rotatable camshaft with end journal portions mounted in semi-cylindrical bearings of the cylinder head, an improved camshaft retention arrangement for the end portion, comprising: a bearing cap with a semi-cylindrical portion at an opposite side of the camshaft journal as the cylinder head bearing portion, the bearing cap having a side portion extending laterally away from a first side of the camshaft and in overlying mating relation to the cylinder head; first fastener means extending through the side portion into the cylinder head to secure the bearing cap to the cylinder head; the semi-cylindrical portion of the bearing cap extending from the side portion about the camshaft journal and terminating just short of a second side of the camshaft so that an area of the cylinder head immediately adjacent the second side of the camshaft is available for placement of a second fastener means for securing the cylinder head to the engine.

2. An improved bearing cap arrangement for an end portion of a camshaft resting within a semi-cylindrical bearing of a cylinder head of an internal combustion engine, the improvement, comprising: a bearing cap having a semi-cylindrical portion overlying the camshaft at a first side of the camshaft opposite the cylinder head bearing portion, the bearing cap having a side portion extending laterally away from the first side of the camshaft and extending in overlying mating relation to the cylinder head; first fastener means extending through the side portion into the cylinder head to secure the bearing cap to the cylinder head; the semi-cylindrical portion of the bearing cap extending from the side portion about the camshaft journal and terminating just short of the a second side of the camshaft so that the surface of the cylinder head immediately adjacent the second side of the camshaft is available for placement of a second fastener for securing the cylinder head to the engine.

3. The improved bearing cap arrangement set forth in claim 1 in which the cylinder head bearing journal and the semicylindrical portion of the bearing cap extends about 315 degrees about the camshaft.

4. The improved bearing cap arrangement set forth in claim 2 in which the cylinder head bearing journal and the semicylindrical cylindrical portion of the bearing cap extends about 315 degrees about the camshaft.

5. The improved bearing cap arrangement set forth in claim 1 in which the second fastener has a head portion and an elongated partially threaded portion with the fastener spaced sufficiently close to the camshaft s that the distance between the surface of the elongated partially threaded portion and the camshaft centerline is less than the outer diameter of the camshaft journal.

6. The improved bearing cap arrangement set forth in claim 2 in which the second fastener has a head portion and an elongated partially threaded portion with the fastener spaced sufficiently close to the camshaft s that the distance between the surface of the elongated partially threaded portion and the camshaft centerline is less than the outer diameter of the camshaft journal.

7. The improved bearing cap arrangement set forth in claim 1 in which the second fastener has a head portion and an elongated partially threaded portion with the fastener spaced sufficiently close to the camshaft so that the distance between the surface of the elongated partially threaded portion and the second side of the camshaft is less than half the outer diameter of the camshaft journal.

8. The improved bearing cap arrangement set forth in claim 2 in which the second fastener has a head portion and an elongated partially threaded portion with the fastener spaced sufficiently close to the camshaft s that the distance between the surface of the elongated partially threaded portion and the second side of the camshaft is less than half the outer diameter of the camshaft journal.

* * * * *